R. Bleakie.
Harness for Loom.
No. 103,708. Patented May 31, 1870.
Sheet 1, 2 Sheets.
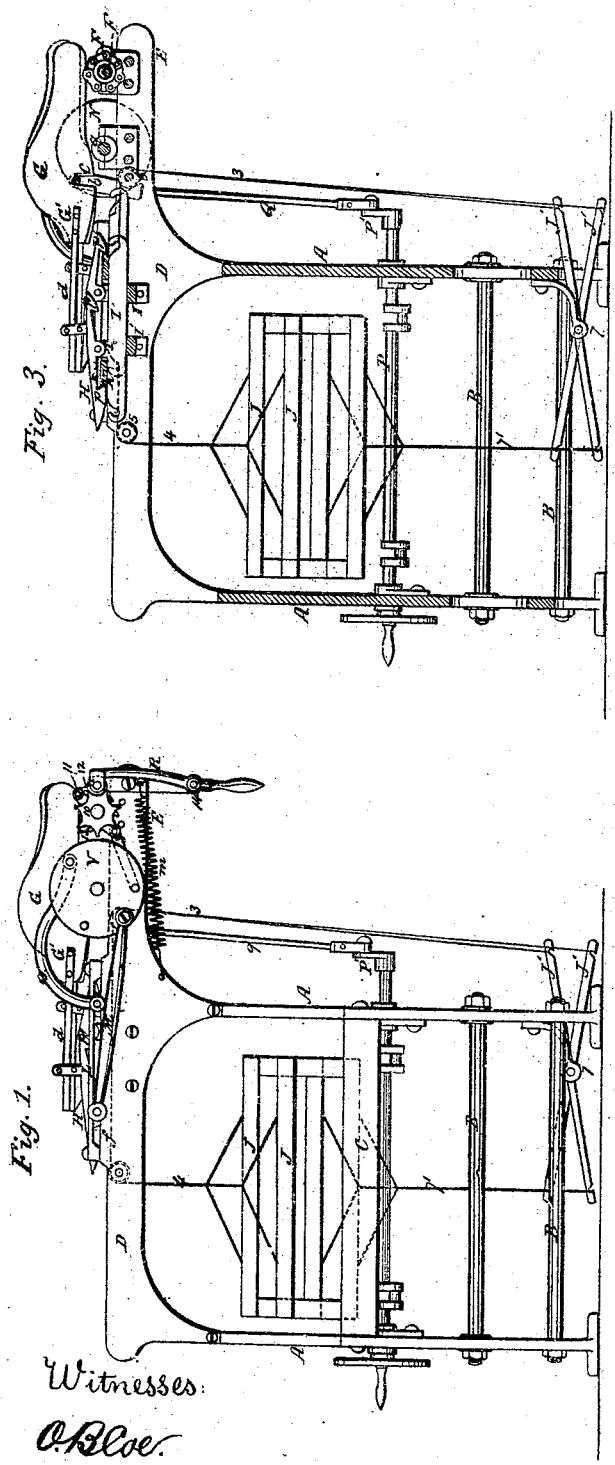
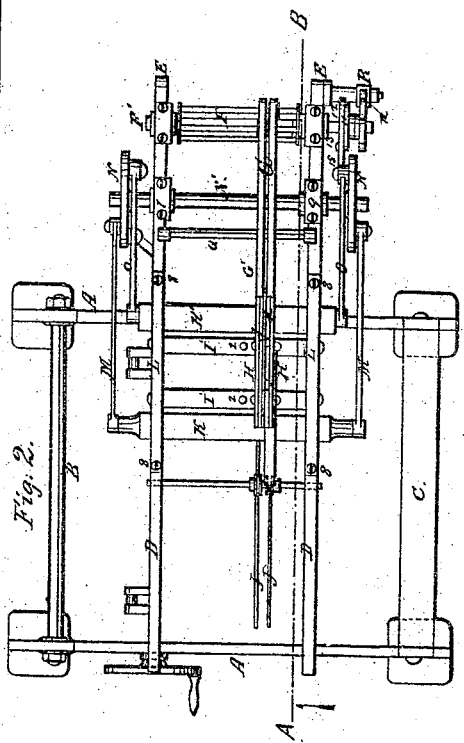
Witnesses:
O. B. Coe.
W. A. Newell.
Inventor.
Robert Bleakie

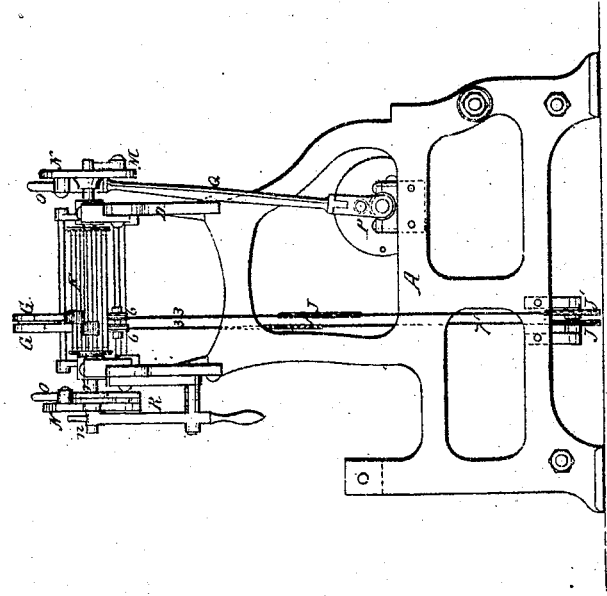
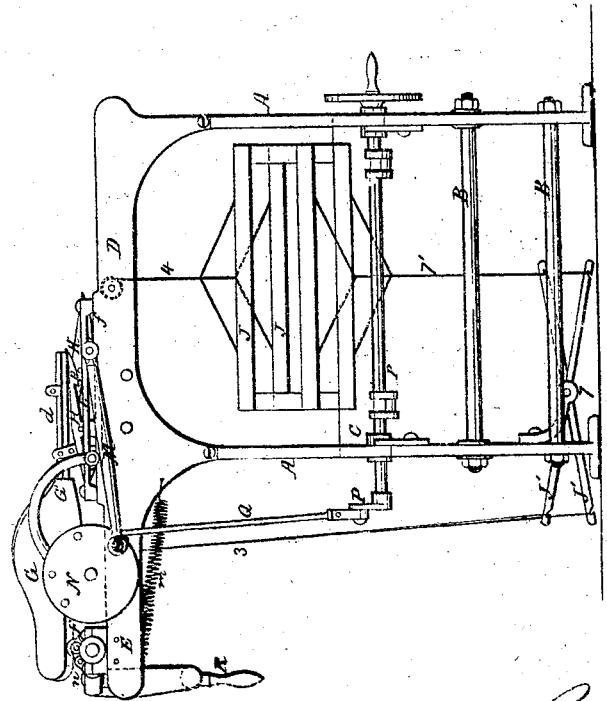

United States Patent Office.

ROBERT BLEAKIE, OF HYDE PARK, ASSIGNOR TO CHARLES W. GILBERT AND S. NEWELL TOFT, OF WORCESTER, MASSACHUSETTS.

*Letters Patent No. 103,708, dated May 31, 1870.*

IMPROVEMENT IN HARNESS-OPERATING MECHANISM FOR LOOMS.

The Schedule referred to in these Letters Patent and making part of the same.

*Know all men by these presents:*

That I, ROBERT BLEAKIE, of Hyde Park, in the county of Norfolk and Commonwealth of Massachusetts, have invented certain new and useful Improvements in Fancy Looms; and I do hereby declare that the following is a full, clear, and exact description of the same, reference being had to the accompanying drawing forming a part of this specification, in which—

Figure 1 represents so much of a fancy-loom as is necessary to illustrate my present improvements;

Figure 2 represents a top or plan view of the same;

Figure 3 represents a section on line A B, fig. 2;

Figure 4 represents a back view; and

Figure 5 represents a view of the end of the loom-frame, upon which the pattern-chain and its operating mechanism are arranged.

To enable those skilled in the art to which my invention belongs to make and use the same, I will describe it more in detail.

The nature of my invention consists—

First, in the combination with the pattern-chain, horizontal indicator-levers, and double hooks of horizontal travelers or slides, as will be hereafter explained.

Second, in the peculiarly-constructed indicator-levers, hereafter described.

Third, in the combination with the horizontal slides or travelers, supported above the harness-frames, of the cords or wires, shears, and bottom harness-levers, as will be hereafter set forth.

In the drawing—

A A are the side pieces of the loom-frame, secured together by the cross-bars or stays B and the breast-beam C.

To the tops of the side pieces A A are secured two top cross-pieces D D, which project beyond the lower part of the frame at one side, as shown at E E.

Upon the outer ends E E of the top pieces D D are supported the pattern-chain F and its shaft F'.

The rear ends of the horizontal indicator-levers G rest on the pattern-chain, as shown in the drawing, said levers being supported on the cross-bar $a$, which is sustained by stands $b$, fastened to the tops of the projecting ends E E of the cross-pieces D D.

The indicator levers G are provided with under slots $c$, whereby they can be easily and quickly removed, for repairs or otherwise.

The front ends of the parts G' of the indicator-levers G are made with slots or recesses to receive the rear ends of the fingers $d$, which are securely fastened in said recesses to the parts G', by screws, pins, or otherwise.

The finger-parts $d$ of the indicator-levers extend forward through slots or holes in the upright projections on the front ends of the double hooks H.

The double hooks H are pivoted to projections 1 on the upper edges of the horizontal slides or travelers I, which slide upon and are supported by the cross-bars I' I'.

When said bars are made thin, they should be held in place by means of guide-pins or lugs 2 on the upper sides of the supporting-bars I'.

The horizontal slides or travelers I are provided with hooks at each end, for the purpose of attaching the cords or wires 3 and 4. The cords 4, passing over sheaves or rolls 5, are connected to the upper sides of the harness-frames J, while the cords 3 pass over rolls or sheaves 6, then down, and are hooked upon the outer ends of the under harness-levers J', as fully indicated in the drawing.

The under levers J' are hinged or pivoted to a proper support, 7, upon which they are free to vibrate, their inner ends being secured to the under sides of the harness-frames by means of cords 7'.

The top pieces D are cast with elevations $f$, and are planed to receive and support the horizontal harness-bars or knives K K', the outer edges of which are made with under bevels, as indicated in drawing, fig. 3.

The harness-bars or knives K are held down in place, as they slide to and from each other, by means of detachable holding or guide-pieces L, fastened, by means of screws or bolts 8, to the upper edges of the projections $f$.

To the ends of the harness bars or knives K are hinged or swiveled the inner ends of the side arms or connections M, the outer ends of said arms or connections being hinged or swiveled to the lower parts of the rocker-plates or arms N N, on the ends of rocker-shaft N', which is supported and rocks in bearings 9, secured to the upper edges of the projecting ends E E of the top pieces D D.

To the ends of the bars or knives K' are hinged or swiveled the inner ends of the curved side arms or connections O O, the rear ends of said connections being hinged or swiveled to the upper parts of the rocker-plates or arms N.

To one end of the crank-shaft P, which works the lay in the ordinary manner, is secured a crank, P', which is connected to one of the rocker-plates N, by means of a connecting-rod, Q, a hinged wrist or joint being used at each end of said connection, for the purpose of preventing binding.

Upon the front end of the pattern-chain shaft F' is fastened a star-wheel, 10, and inside of that a pawl-holder, 11, to the inside of which is secured the pawl 12, which takes into the ratchet-wheel 13, and thereby moves the pattern-chain and its shaft when the loom is in operation.

A friction-finger, R, is pivoted at 14, and carries upon its upper end a friction-roll, $x$, which fits into the star-wheel 10, to prevent the chain mechanism from being thrown out of position only when moved by the ratchet 13, at which times the upper end of lever R is thrown back, the spring m yielding for that purpose.

The lower end of pawl-holder 11 is connected to one of the rocker-plates or arms N, by means of a hinged or swivel-connection, 15.

Power being applied to the crank-shaft P, a rocking or reciprocating motion will be communicated to the rocker-plates N N, and a sliding motion to the harness-knives or bars K K', said bars sliding to and from each other, while, at the same time, the pattern-chain F will have an intermittent rotary motion imparted to it by means of the action of pawl 12 upon the ratchet-wheel 13.

The indicator-levers G are suspended so that their weight causes their fingers d to be elevated, as shown in blue lines, fig. 3, when their outer ends are not elevated by the pattern-chain, as shown in dotted lines in same figure, while the double hooks H are so constructed that their outer ends will be elevated, unless forced down by the depression of fingers d.

As a consequence of this construction, all the inner ends of the double hooks H will be caught by the harness-bar or knife K, in the formation of each shed, except those whose outer ends are depressed by the fingers d, which will be caught by the harness-operating knife or bar K'.

It will be seen that, when the harness-slides or knives K K' are moved toward each other, they will strike the projections 1, and thus move the slides I and double hooks H, so as to even the harnesses J, slides I and double hooks H being also evened at the same time, and which operation takes place at each beat of the lay. Simultaneously with each evening operation the pattern-chain is moved so as to change the position of the indicating levers G, to cause the desired number of harnesses to be raised or depressed, as the case may be, by the action of the bars or knives K K', the pattern-chain F being used in the usual manner.

The number of harnesses to be raised will be indicated by the number of levers G which have their outer ends elevated; all the other harnesses will be depressed.

It will be seen, from the foregoing description, that my indicating mechanism is not only simple in construction, but is very effectual and accurate, not depending upon springs; nor is it liable to any derangement by reason of the springing or yielding of tension-wires or connections.

It will also be observed that the indicating-levers are not liable to injury or breakage by any accidental derangement of the pattern-chain, whereby their outer ends are prematurely raised, since their connections with the supporting-bar are such as to allow the rear parts G' to be raised bodily.

In the employment of the various indicating mechanisms used in fancy-looms, the double hooks are more or less liable to slip from or become detached from the bars or knives by which they are moved during the operation of forming the sheds, thereby causing imperfect weaving.

To remedy such objections, resort has been had to springs and other similar devices.

In the use of my harness-operating and indicating mechanism, the foregoing objections are obviated by the indicating-levers themselves.

The fingers d tend to hold the hooks p upon harness-operating bar or knife K when the outer ends of the indicating-levers are depressed, as shown in full lines, fig. 3, and upon harness-operating bar or knife K' when the outer ends of the indicating-levers are elevated, as shown in dotted lines, same figure.

By arranging the pattern-chain, indicating mechanism, and mechanism for evening and spreading the harnesses upon the extended ends of the cross-pieces D, and to one side of the center of the loom, as shown and described, the use of long arms and levers and complicated mechanism heretofore in use is obviated, while the pattern-chain, indicating and harness-operating mechanism can be more conveniently reached for repairs and other purposes.

Then, again, by my arrangement and construction a lesser amount of metal is required than has heretofore been found necessary, owing to the compact manner in which the mechanism is arranged and combined.

Having described my improvements in fancy-looms,

What I claim therein as new and of my invention, and desire to secure by Letters Patent, is—

1. The pattern-chain, horizontal indicator-levers, the double hooks, and the horizontal travelers or slides constructed as described, and arranged, in relation to each other and at the top of the loom-frame, as and for the purposes set forth.

2. The indicator-lever G, with its finger d and slotted part G', substantially as and for the purposes set forth.

3. The combination, with the horizontal slides or travelers I, arranged at the top of the loom-frame, and to one side of the center thereof, of the cords or wires 3, 4, and 7, sheaves or rolls 5 6, and under levers J', substantially as and for the purposes set forth.

ROBERT BLEAKIE.

Witnesses:
HENRY S. BUNTON,
WM. SCOTT.